US009471257B2

(12) United States Patent
Kaminaga (10) Patent No.: US 9,471,257 B2
(45) Date of Patent: Oct. 18, 2016

(54) SEMICONDUCTOR MEMORY DEVICE (71) Applicant: Winbond Electronics Corp., Taichung (TW)

(72) Inventor: Takehiro Kaminaga, Fuchu (JP)

(73) Assignee: WINBOND ELECTRONICS CORP., Taichung (TW)

( * ) Notice: Subject to any disclaimer, the term of this patent is extended or adjusted under 35 U.S.C. 154(b) by 85 days.

(21) Appl. No.: 14/259,828

(22) Filed: Apr. 23, 2014

(65) Prior Publication Data

US 2015/0026393 A1 Jan. 22, 2015

(30) Foreign Application Priority Data

Jul. 17, 2013 (JP) .................. 2013-148117

(51) Int. Cl.
*G06F 12/02* (2006.01)
*G06F 3/06* (2006.01)

(52) U.S. Cl.
CPC ........... *G06F 3/0688* (2013.01); *G06F 3/0611* (2013.01); *G06F 3/0659* (2013.01)

(58) Field of Classification Search
CPC .................................................. G06F 12/0246
See application file for complete search history.

(56) References Cited

U.S. PATENT DOCUMENTS

| 2003/0095437 | A1* | 5/2003 | Imamiya | G06F 9/24 365/185.17 |
| 2004/0230738 | A1* | 11/2004 | Lim | G06F 9/4403 711/103 |
| 2006/0245274 | A1 | 11/2006 | Choi et al. | |
| 2010/0325347 | A1* | 12/2010 | Koh | G06F 9/3881 711/103 |
| 2012/0005411 | A1 | 1/2012 | Rolandi et al. | |
| 2012/0110246 | A1* | 5/2012 | Rolandi | G11C 16/26 711/103 |

FOREIGN PATENT DOCUMENTS

| JP | 2005-301831 A | 10/2005 |
| JP | 2008 502090 | 1/2008 |
| JP | 2009-175877 A | 8/2009 |
| JP | 2010-123255 A | 6/2010 |
| JP | 2013-030269 A | 2/2013 |
| JP | 2013222435 A | 10/2013 |
| JP | 2013-246630 | 12/2013 |
| KR | 10-2007-0060101 | 6/2007 |
| TW | 200405198 A | 4/2004 |
| WO | WO 2006/026645 | 3/2006 |

OTHER PUBLICATIONS

Webopedia, Flag, Oct. 27, 2002, Available at: https://web.archive.org/web/20021027132544/http://webopedia.com/TERM/F/flag.html.*

* cited by examiner

*Primary Examiner* — Ryan Bertram
(74) *Attorney, Agent, or Firm* — Muncy, Geissler, Olds & Lowe, P.C.

(57) ABSTRACT

A semiconductor memory device includes a memory array, a setting unit and a control unit. The memory array consists of non-volatile memory cells. The setting unit set a page address of the memory array which is initially read out at startup. The control unit performs an internal sequence to read out the page address from the setting unit at startup and, according to the read-out page address, transmits page data corresponding to the read-out page address from the memory array to a page buffer.

11 Claims, 8 Drawing Sheets

| | Erase | Write-in | Read-out |
|---|---|---|---|
| Selected W/L | 0 | 15~20V | 0 |
| Unselected W/L | F | 10V | 4.5 |
| SGD | F | Vcc | 4.5 |
| SGS | F | 0 | 4.5 |
| SL | F | Vcc | 0 |
| P-Well | 21 | 0 | 0 |

SEMICONDUCTOR MEMORY DEVICE

CROSS REFERENCE TO RELATED APPLICATIONS

This Application claims priority of Japan Patent Application No. 2013/148117, filed on Jul. 17, 2013, the entirety of which is incorporated by reference herein.

BACKGROUND OF THE INVENTION

1. Field of the Invention

The invention relates to a semiconductor memory device such as a NAND type flash memory, and more particularly to a semiconductor memory device having a function of transmitting data at startup of a system or the like.

2. Description of the Related Art

A NAND type flash memory comprises a memory cell array consisting of a plurality of NAND strings, each of which comprises a plurality of memory cells connected in serial. The NAND type flash memory can be used to achieve a highly integrated memory cell array as compared to a NOR type flash memory, and thus the NAND type flash memory is suitable for use in storing large volumes of data such as image data and music data. In addition to the use described above, the NAND type flash memory can also be used as a memory for providing boot codes at startup of an electronic apparatus or a system. The boot codes are data used for starting up an operating system of a host-side electronic apparatus or system.

Figure 1A:
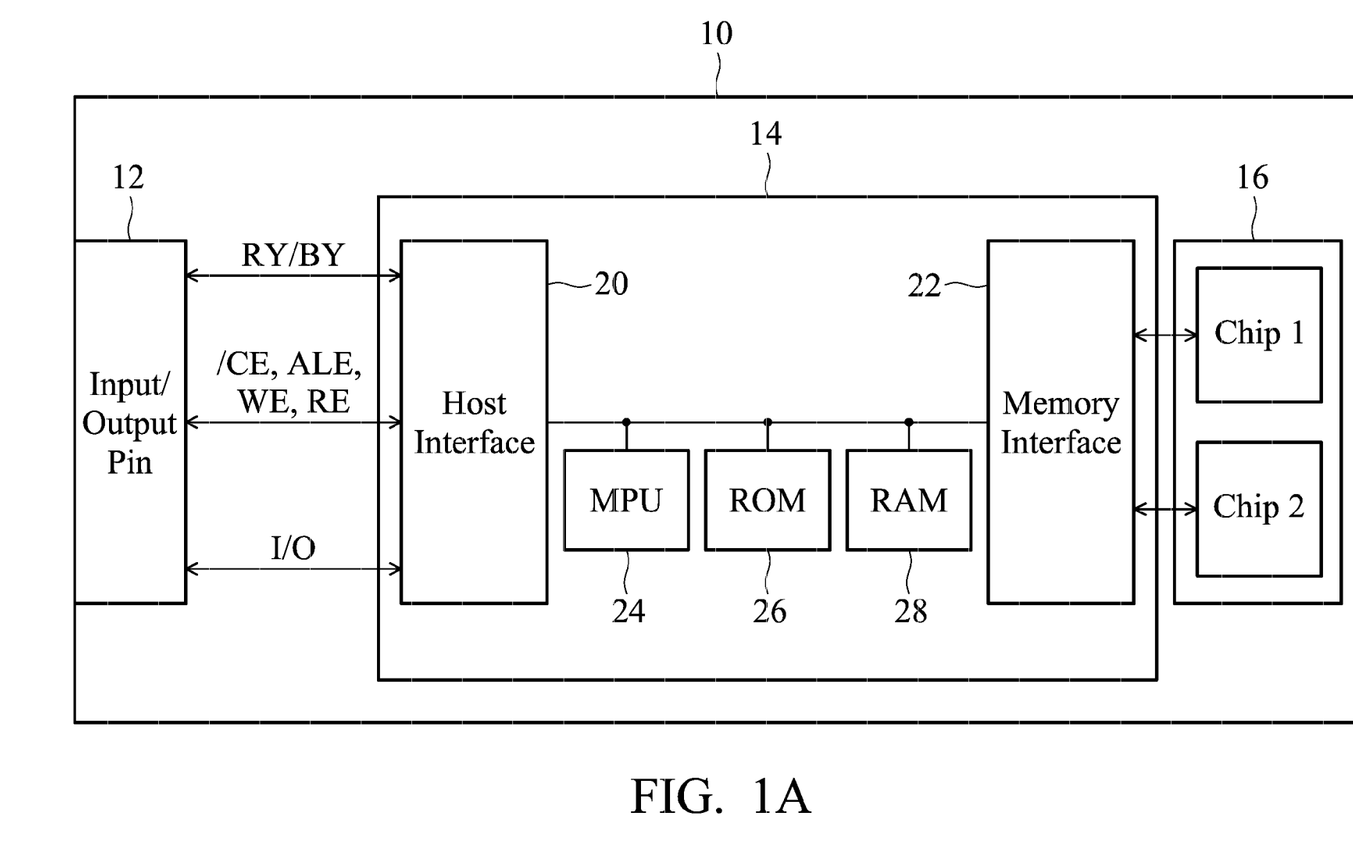
FIG. 1A is a block diagrams of a configuration of a semiconductor memory system for outputting boot codes according to prior arts.
Figure 1B:
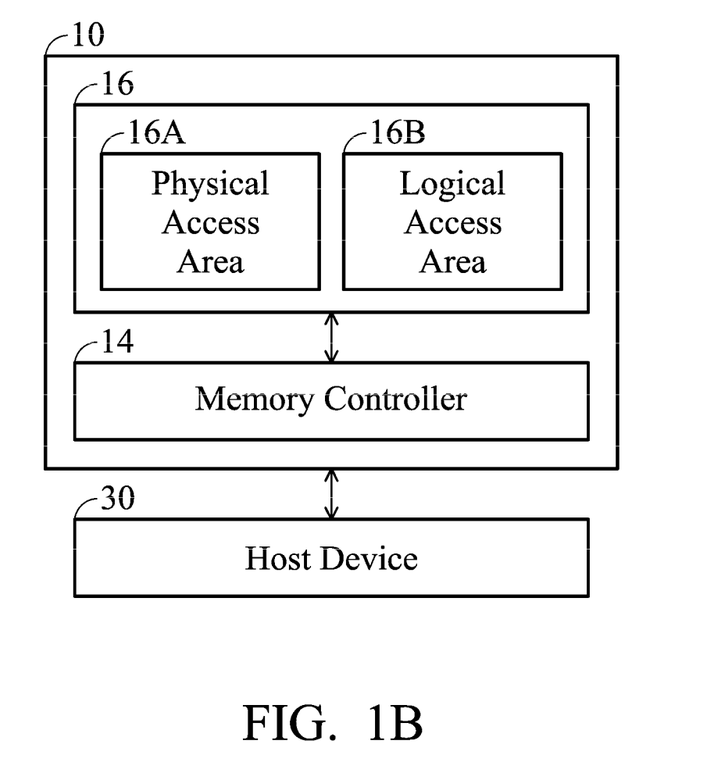
FIG. 1B is a block diagrams of a configuration of a semiconductor memory system for outputting boot codes according to prior arts.

FIG. 1 illustrates a block diagram of a system configuration of a conventional semiconductor memory (Patent Document 1) which can output boot codes to a host system. As shown in FIG. 1A, a semiconductor memory 10 comprises an input/output pin 12, a memory controller 14 and a memory part 16. The input/output pin 12 is used to input/output data between the semiconductor memory 10 and a host device 30. The memory controller 14 comprises: a host interface 20, transmitting data to and receiving data from the host device 30 through the input/output pin 12; a memory interface 22, transmitting data to and receiving data from the memory part 16; a micro processing unit (MPU) 24, controlling data transmission; a read only memory (ROM) 26 storing program codes and data; and a random access memory (RAM) 28. The memory part 16 comprises 2 chips, such as NAND type flash memory chips. In addition, as shown in FIG. 1B, the memory part 16 comprises a physical access area 16A that can be accessed by using a physical address and a logical access area 16B that can be accessed by using a logical address. Boot codes of the host device 30 are stored in the physical access area 16A. The boot codes are data used for starting up (booting) the operating system of the host device 30. According to the configuration described above, the boot codes can be provided to the host device 30 in a case where the host device 30 corresponds only to a physical access method.

RELATED PATENT DOCUMENTS

[Patent Document 1] JP 2009-175877

BRIEF SUMMARY OF THE INVENTION

Problems to be Solved

In a host system where a NAND type flash memory is used as a memory for storing boot codes, the boot codes are read out from the flash memory during the startup or power-up and then the system can start up. There is a variety of methods for the boot-up sequence of the chip set and the operating system. However, in order to read out the boot codes from the flash memory after the startup, the system except the flash memory (such as an on-chip ROM in the chip set or the host device) has to have a first read-out command and address information. Therefore, it takes a predetermined period of time for the startup of the system.

The purpose of the invention is to provide a semiconductor memory that is capable of reducing startup time of a system. In addition, the purpose of the invention is further to provide a semiconductor memory that is capable of freely setting an address which is initially read out at startup.

Means for Solving the Problems

An embodiment of the invention provides a semiconductor memory device, comprising: a memory array, consisting of non-volatile memory cells; a setting unit, setting a page address of the memory array which is initially read out at startup; and a control unit, performing an internal sequence to read out the page address from the setting unit at startup and, according to the read-out page address, transmit page data corresponding to the read-out page address from the memory array to a page buffer.

In a preferred embodiment, the setting unit further sets indication information indicating whether the page address has been stored, and the control unit determines whether to perform the internal sequence or not according to the indication information.

In a preferred embodiment, the setting unit comprises a register which is accessed by the control unit at startup, and the register stores the page address in a predetermined area.

In a preferred embodiment, the register further stores flag information indicating whether the page address has been stored.

In a preferred embodiment, the setting unit set the page address in response to a user command performed by a host device.

In a preferred embodiment, the internal sequence is a power-up sequence which is performed when the semiconductor memory device powers up, and the internal sequence comprises performing a read-out command.

In a preferred embodiment, the semiconductor memory device is a flash memory.

Another embodiment of the invention provides a method for starting up a system, applied to a system comprising a semiconductor memory device and a host device, comprising: setting a page address of a memory array which is initially read out at startup to the semiconductor memory device; and performing an internal sequence to read out the set page address from the setting unit at startup of the semiconductor memory device and, according to the read-out page address, transmitting page data corresponding to the read-out page address from the memory array to a page buffer.

In a preferred embodiment, the step of setting the page address of the memory array which is initially read out at startup to the semiconductor memory device comprises: programming the page address into a register according to a user command performed by the host device.

Still another embodiment of the invention provides a computer program product, performed by a semiconductor memory device to perform a startup method, wherein the startup method comprises: performing an internal sequence to read out a page address which is initially read out at startup from a register where the page address is set and transmit page data corresponding to the read-out page address from a memory array to a page buffer.

In a preferred embodiment, the startup method further comprises: performing the internal sequence according indication information indicating whether the page address has been set to the register.

Effect of the Invention

According to the invention, the startup time of the system can be reduced by setting the page address which is initially read out at the startup and automatically transmitting the page data of the page address to the page buffer. Furthermore, the flexibility of the address mapping can be widened by changing the setting of the page address.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

It is to be understood that the following disclosure provides many different embodiments, or examples, for implementing different features of the application. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

The embodiments of the invention are described below with references made to the accompanying drawings. In addition, to be noted, for simplicity and clarity, the elements in the Figures may be modified and have different proportions from that in the practical situation.

Figure 2:
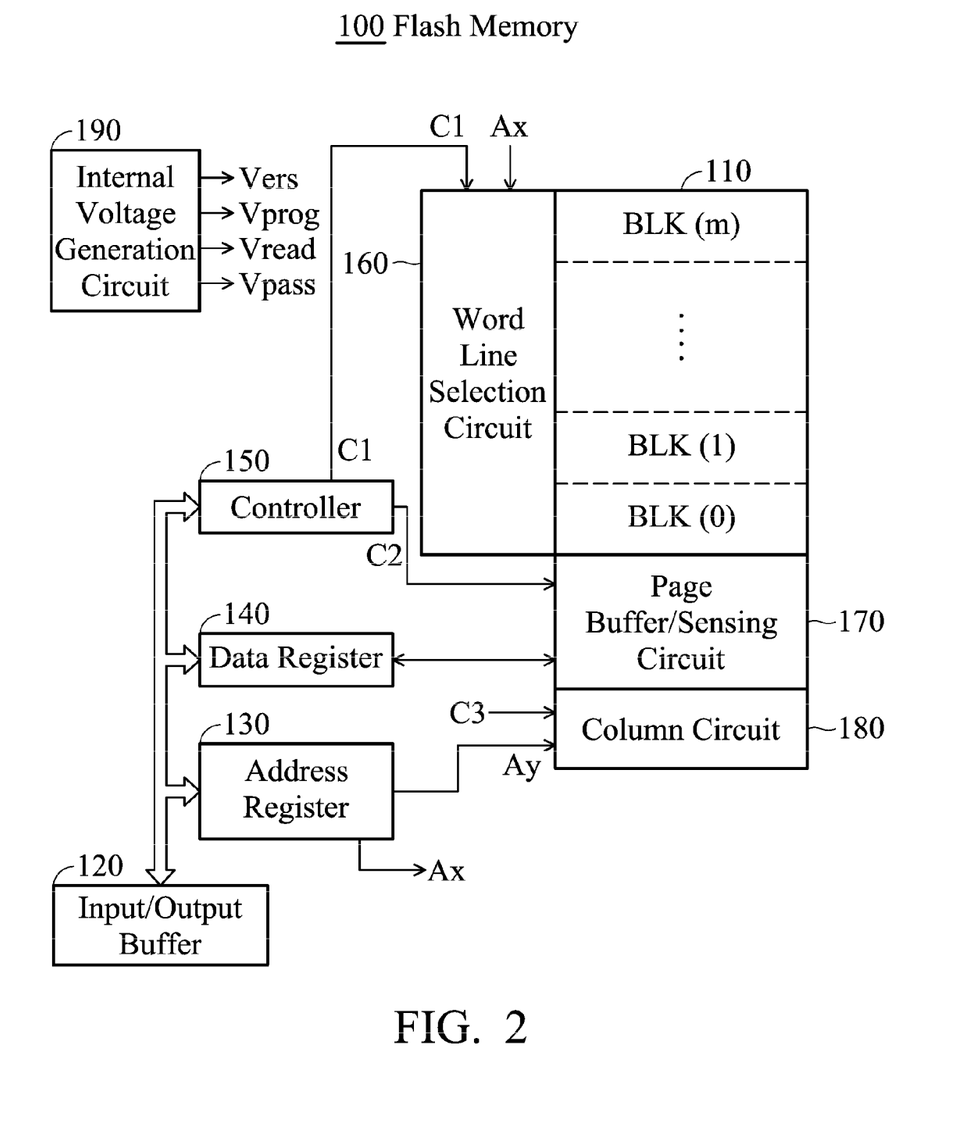
FIG. 2 is a block diagram of an example of a configuration of a flash memory according to an embodiment of the invention.

FIG. 2 is a block diagram of an example of a configuration of a flash memory according to an embodiment of the invention. It is noted that the configuration of the flash memory as shown in FIG. 2 is only exemplary, and the invention is not limited thereto.

The flash memory 100 in the embodiment comprises: a memory array 110, consisting of a plurality of memory cells arranged in columns and rows; an input/output buffer 120, connected to an external input/output terminal I/O and storing input/output data; an address register 130, receiving address information form the input/output buffer 120; a data register 140, storing the input/output data; a controller 150, providing control signals C1, C2, C3, and so on for controlling components according to command information from the input/output buffer 120 and external control signals (such as a chip enable signal and an address latch enable signal not shown in the figure); a word line selection circuit 160, decoding row address information Ax received from the address register 130 and performing selection of a memory block and selection of a word line according to the decoding result; a page buffer/sensing circuit 170, storing data read out from a page selected by the word line selection circuit 160 and storing data to be written-in to the selected page; a column selection circuit 180, decoding column address information Ay received from the address register 130 and selecting column data in the page buffer 170 according to the decoding result; and an internal voltage generation circuit 190, generating voltages for reading-out data, programming data and erasing data (programming voltage Vprog, pulse voltage Vpass, read-out pulse voltage Vread, erase voltage Vers, and so on).

The memory array 110 comprises memory blocks BLK (0), BLK(1) . . . BLK(m−1) arranged along the column direction. The page buffer/sensing circuit 170 is configured at one end of the blocks. Nevertheless, the page buffer/sensing circuit 170 can be configured at the other one end or both ends of the blocks.

Figure 3:
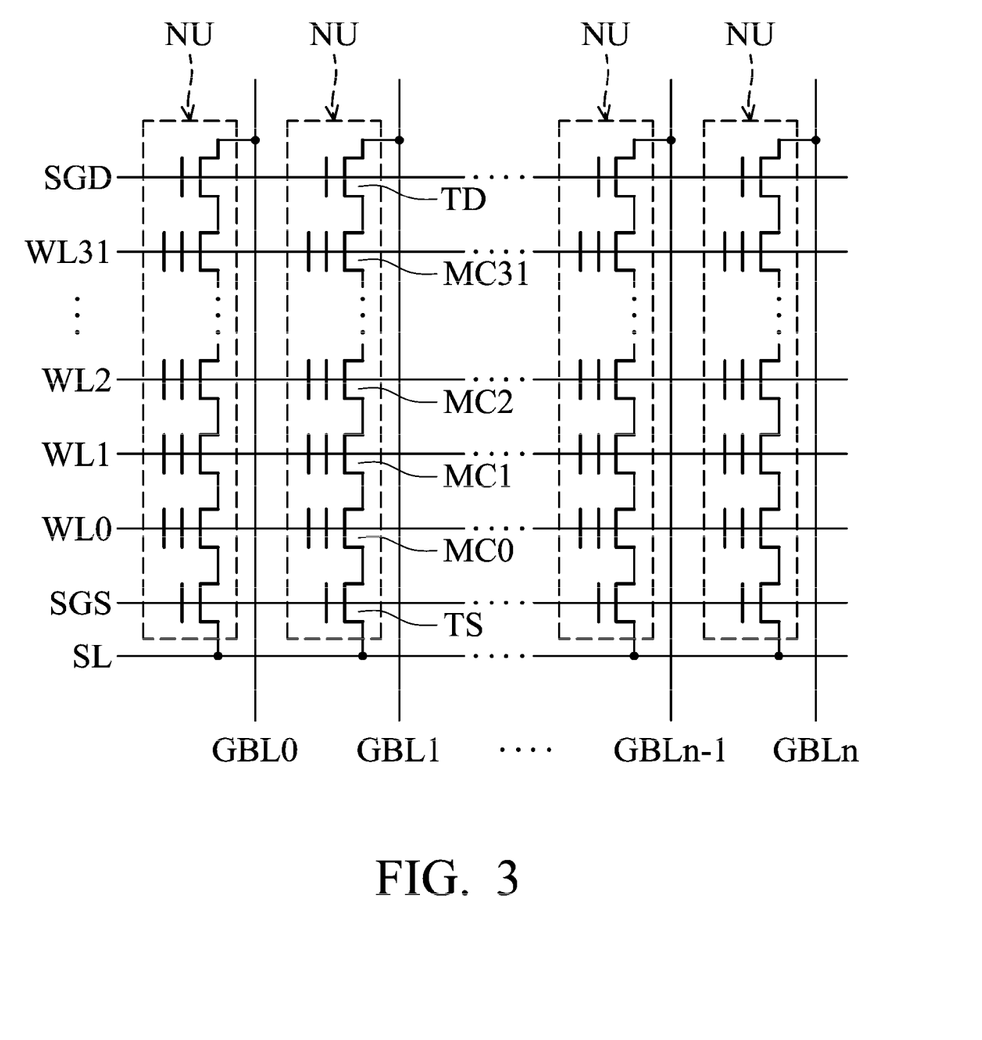
FIG. 3 is a circuit diagram of a configuration of NAND strings according to an embodiment of the invention.

As shown in FIG. 3, a memory block comprises a plurality of NAND string units NU. One memory block comprises n+1 string units NU arranged along the row direction. Each string unit NU comprises a plurality of memory cells MCi (i=0, 1 . . . , 31) connected in serial, a select transistor TD which is at one end of the string unit NU and connected to a drain side of the memory cell MC31 and a select transistor TS which is at the other end of the string unit NU and connected to a source side of the memory cell MC0. A drain of each select transistor TD is connected to one corresponding bit line GBL, and a source of each select transistor TS is connected to a common source line SL.

A control gate of the memory cell MCi is connected to a corresponding word line WLi. A gate of each select transistor TD and a gate of each select transistor TS are connected to a select gate line SGD and s select gate line SGS, respectively. The select gate line SGD and the select gate line SGS are parallel to the word line WLi. When the word line selection circuit 160 selects a memory block according to the row address Ax, the select transistors TD and TS are selectively driven through the select gate lines SGS and SGD of the memory block.

Conventionally, a memory cell comprises a metal oxide semiconductor (MOS) structure. The MOS structure comprises a source/drain consisting of a N-type diffusion region formed in a P well region, a tunnel oxide film formed on a channel between the source and the drain, a floating gate (charge accumulation layer) formed on the tunnel oxide film and a control gate formed on the floating gate through a dielectric layer. When no charge is accumulated in the floating gate, that is, when data "1" is written, the threshold is negative and the memory cell is normally on. When electrons are accumulated in the floating gate, that is, when data "0" is written, the threshold is shifted toward a positive value and the memory cell is normally off.

Figure 4:
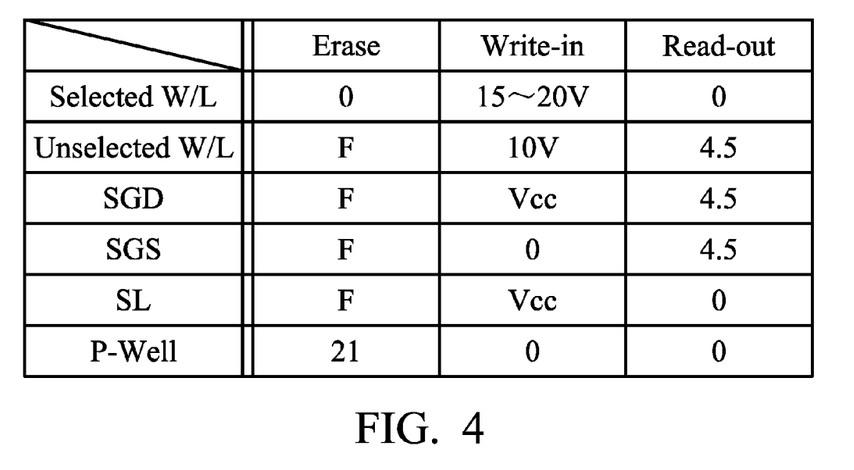
FIG. 4 is a block diagram of an example of voltages supplied to cells of a flash memory according to an embodiment of the invention.

FIG. 4 is a block diagram of an example of voltages supplied in operations of a flash memory according to an embodiment of the invention. In a read-out operation, a specific positive voltage is supplied to bit lines, a specific voltage (for example, 0V) is supplied to a word line which is selected (selected word line), a pulse voltage Vpass (for example, 4.5V) is supplied to a word line which is not selected (unselected word line), a positive voltage (for example, 4.5V) is supplied to the select gat lines SGD and SGS, the bit line select transistors TD and the source line select transistors TS are turned on, and 0V is supplied to the common source line SL. In a programming (write-in) operation, a programming voltage Vprog of high voltage (for example, 15~20V) is supplied to a word line that is selected, a voltage of intermediate voltage level (for example, 10V) is supplied to a word line which is not selected, the bit line select transistors TD are turned on, the source line select transistors TS are turned off, and a voltage level corresponding to data "0" or "1" is supplied to the bit line GBL. In an erasing operation, 0V is supplied to a word line which is selected in the block, a high voltage (for example, 20V) is supplied to the P well region, and the electrons in the floating gate are pulled to the substrate so as to erase data in unit of block.

Figure 5:
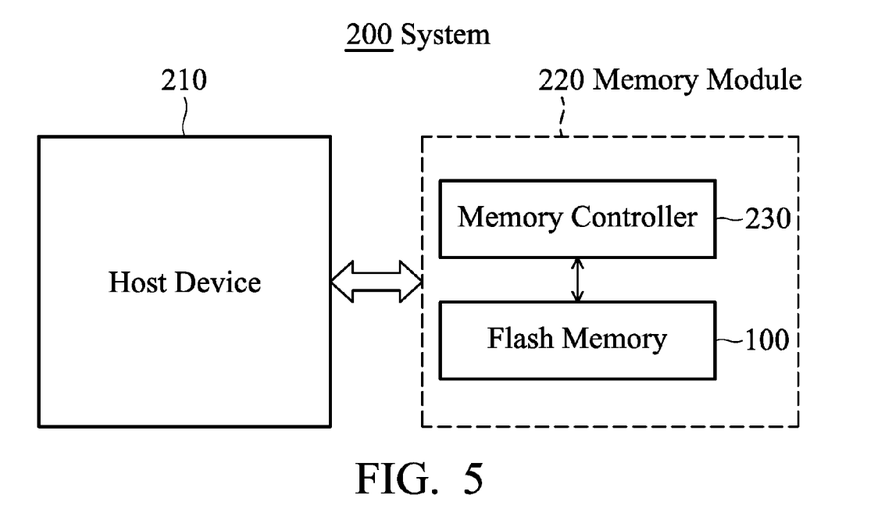
FIG. 5 is a simplified block diagram of a system comprising a flash memory according to an embodiment of the invention.

FIG. 5 is a block diagram of a system comprising a flash memory according to an embodiment of the invention. As shown in FIG. 5, the system 200 comprises a host device 210 and a memory module 220 connected to the host device 210. The host device 210 can be, but not limited to, a chip equipped on a chipset or an electronic apparatus such as a computer, a digital camera or a printer. The memory module 220 comprises a memory controller 230 having the same function as the memory controller 14 in FIG. 1 and a flash memory 100. The memory controller 230 controls data transmission between the host device 210 and the flash memory 100.

Figure 6:
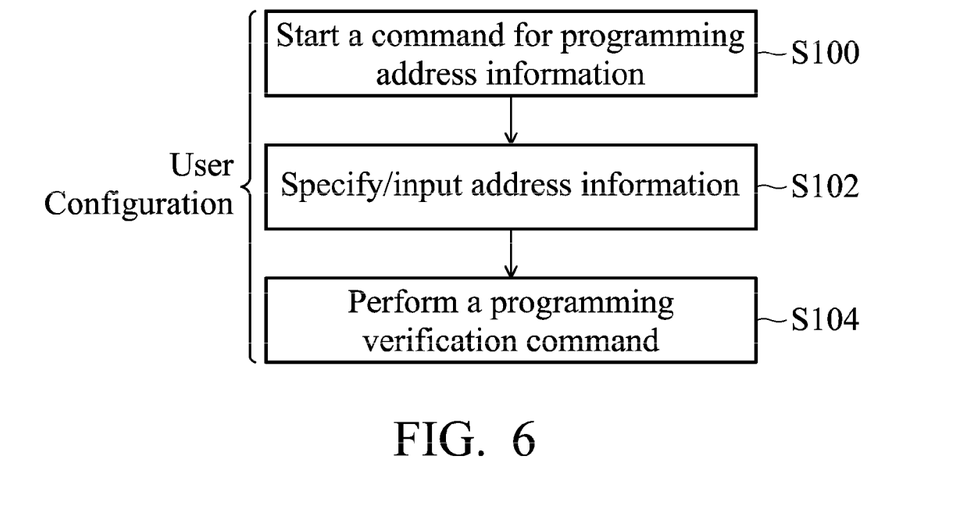
FIG. 6 is a flow chart of setting a page address which is read out at startup of a flash memory.

Setting of address information will be described in the following. In the beginning, in order to set address information which is initially read out at startup to the flash memory, the host device performs a user command. FIG. 6 is a flow chart of setting the address information.

First of all, a command for programming address information from the host device 210 is started (step S100). The command is a user command used by the user and has a sequence different from sequences of normal programming start commands (80h, 81h, 85h). When the command for programming address information is started, the host device 210 transmits predetermined commands and external control signals to the flash memory 100 so as to set address information which is initially read out at startup of the system to the flash memory 100.

Then, the user designates address information which is initially read out at startup and inputs the designated address information which is initially read out at startup (step S102). In a preferred embodiment, the address information comprises a page address in the memory array 110. The page address which can be designated by the user is in an area of the memory array 110. The input address information in the host device 210 is temporarily stored in, for example, the data register 140 of the flash memory through the memory controller 230.

Figure 7:
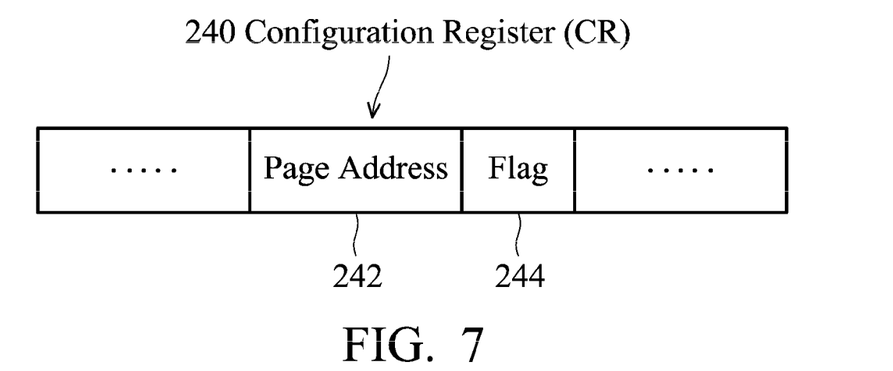
FIG. 7 is a block diagram of an example of setting address information to a flash memory.

Next, the host device 210 performs a programming verification command (step S104). In response to the performed programming verification command, the flash memory 100 performs a programming operation of the address information. In a preferred embodiment, the controller 150 programs the address information stored in the data register 140 into a configuration register (CR) which the flash memory has to access or refer to at startup. FIG. 7 is a block diagram of an example of a configuration of the configuration register. The configuration register 240 stores the page address received from the host device 210 in an address storage area 242 and stores a flag indicating that the page address has been stored, such as "1", in a flag area 244. On the other hand, in a case where the page address has not been programmed yet, the flag remains "0".

The configuration register 240 is a register to set operation information of the flash memory 100. For example, information required to start up the flash memory is set to other areas of the configuration register 240. For example, in a wafer stage, circuit characteristics of a selected wafer or test devices are measured, and then trimming codes or trimming levels of operations of the flash memory which are set according to the measurement result are stored. During normal operations, the user can't see the stored content in the configuration register 240 but can verify the stored content by performing a specific mode or specific commands. In a preferred embodiment, the controller 150 comprises a firmware, a state machine or the like for programming the page address into the configuration register in response to the performing of the user command of the host device 210.

Then, automatic data transmission of the flash memory at startup will be described with references made to the flow chart in FIG. 8. When the system 200 in FIG. 5 starts up, the power of the flash memory is turned on (step S200), and the controller 150 performs a power-up sequence. In a preferred embodiment, the controller 150 comprises a program or state machine for performing the power-up sequence. In the power-up sequence, the controller 150 accesses the configuration register 240 and checks (verifies) the flag set in the flag area 244 to determine the next internal operation. If the boot-up page address has not been programmed, that is, if the flag is "0", the flash memory performs normal startup as usual and waits for the input of the initial command from the host device 210 (step S204).

On the other hand, if the flag is "1", since the page address which is read out at startup has been programmed, the controller 150 performs an internal command "00h" (step S206), reads out the page address from the address storage area 242 and sets the read-out page address to the address register 130 (step S210). Then, the controller 150 performs an internal command "30h" (step S212). In response to the performing of the internal command "30h" of the controller 150, the word line selection circuit 160 selects a page address and page data of the selected page address is transmitted to the page buffer 170 (step S214). The page data transmitted to the page buffer 170, that is, the boot-up data, is output to the memory controller 230 or the host device 210 from the input/output buffer 120 (step S216) by responding to toggles of the read-out clock signal RE#.

Figure 8:
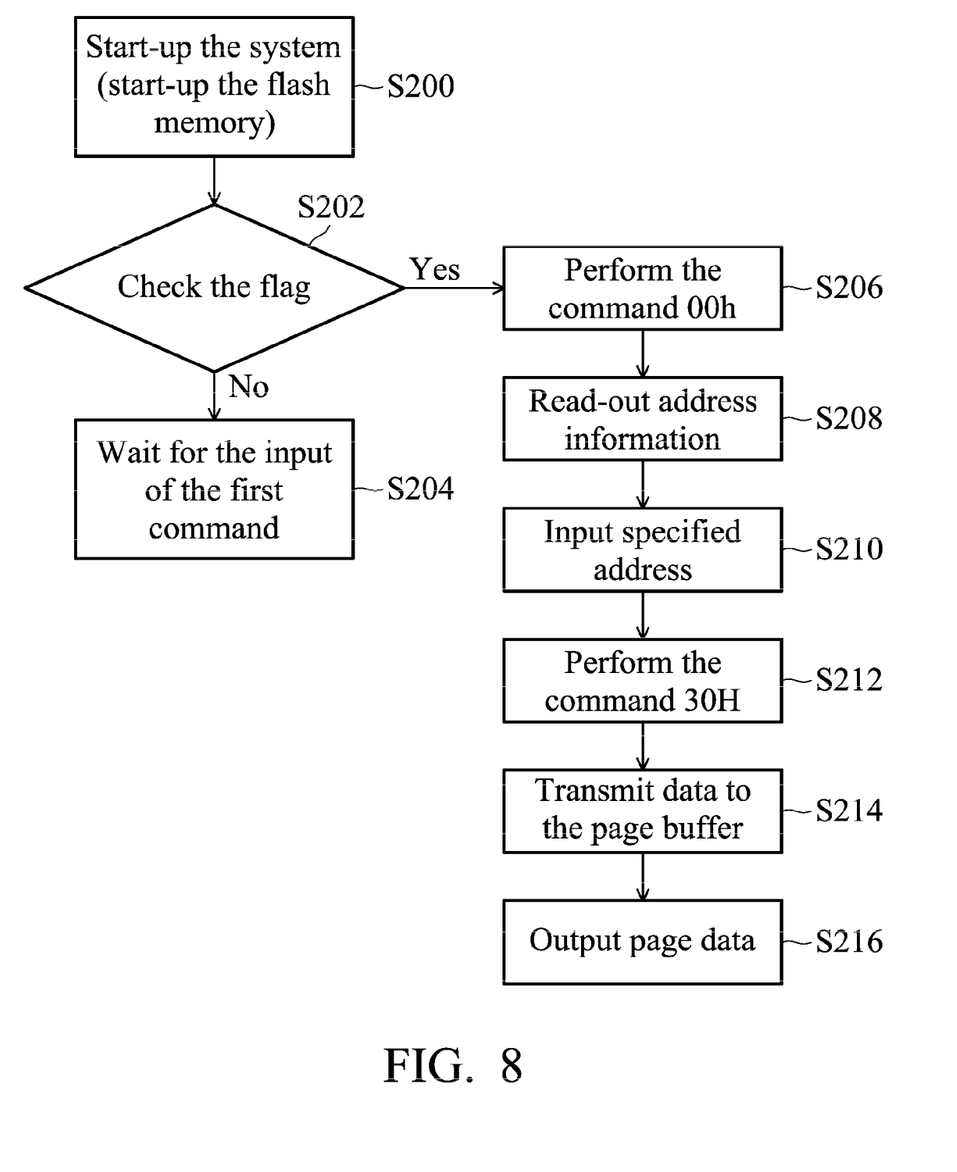
FIG. 8 is a flow chart of an operation of a flash memory according to an embodiment of the invention.
Figure 9:
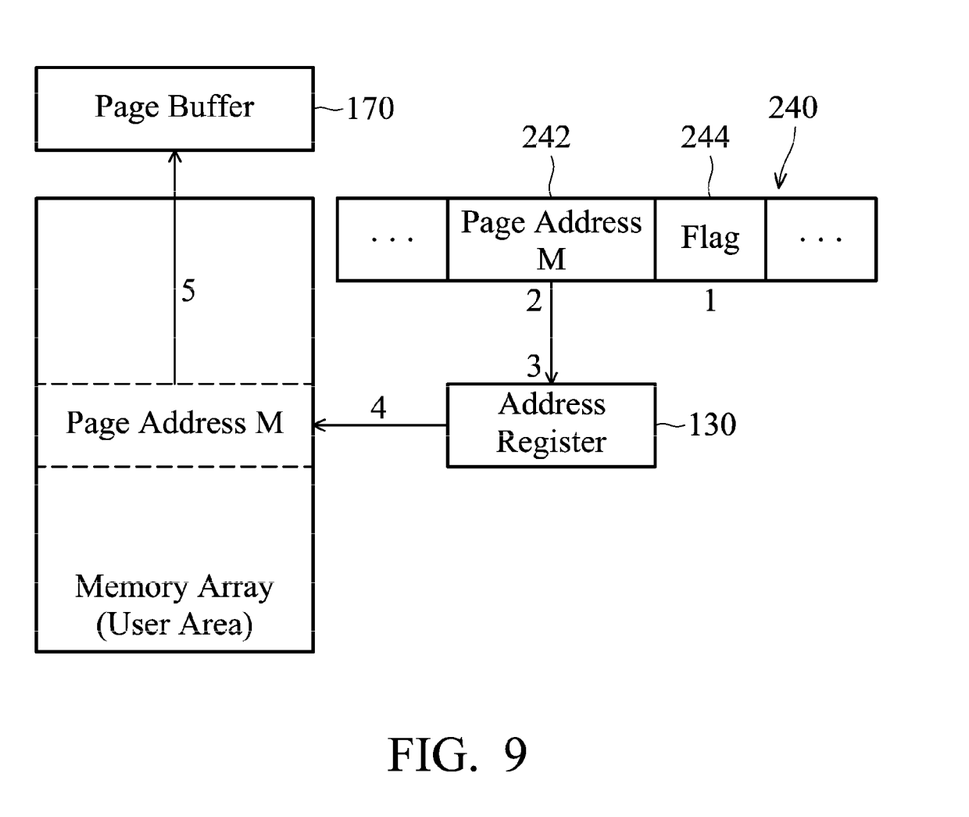
FIG. 9 is a block diagram schematically showing an operation of a flash memory at startup according to an embodiment of the invention.

FIG. 9 is a block diagram schematically showing the flow chart in FIG. 8. As shown in FIG. 9, the binary value of the flag in the configuration register 240 is checked (operation 1). If the flag is "1", a page address M is read out (operation 2), and then the page address M is stored in the address register 130 (operation 3). Next, a read-out verification command is performed (operation 4), and page data of the page address M is transmitted to the page buffer 170 (operation 5).

According to the embodiment, when starting up or powering up, the flash memory can internally set a read-out command and a page address. Data of the page address can be automatically transmitted to the page buffer and output from the page buffer. Accordingly, commands, address input and detection of initial read-out busy (tR) can be omitted from the system and thus waiting time for the initial read-out at startup of the system can be reduced.

Furthermore, since the page address which is initially read out at startup is set to any position in the user area, the flexibility of the address mapping can be widened. By performing the user command shown in FIG. 6, the page address programmed into the configuration register can be arbitrarily replaced by any other address. For example, if the memory array of the flash memory has a defect, the page address which is read out at startup can be changed to prevent from using an area where the defect occurs.

In the embodiments described above, though the example of programming the address information comprising the page address and the flag into the configuration is illustrated, the address information is not limited to be programmed into the configuration register. For example, the address information can be programmed into any other rewritable nonvolatile register which is accessed or referred to by the controller 150 in the power-up sequence. In addition, the boot-up data of the page address which is initially read out at startup can be freely programmed by the user. Moreover, though "00h" and "30h" are used as examples of internal read-out commands performed by the flash memory in the embodiments described above, the invention is not limited thereto. In brief, "00h" and "30h" can also be commands or control signals for reading out the page address in the register according to internal read-out commands on the premise that the flash memory doesn't receive commands from the outside in the power-up sequence. Furthermore, though the flash memory where each memory cell stores binary data is used as an example in the embodiments described above, the invention is not limited thereto. For example, the invention is also applied to a flash memory where each memory cell stores multiple value data.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A semiconductor memory device, comprising:
a memory array, consisting of non-volatile memory cells;
a setting unit, setting a page address of the memory array which is initially read out at startup;
a control unit, performing an internal sequence to read out the page address from the setting unit at startup and, according to the read-out page address, transmit page data corresponding to the read-out page address from the memory array to a page buffer; and
a data register, provided to storing address information which comprises the page address;
wherein the setting unit comprises a register accessed by the control unit at startup, and the register stores the page address in a predetermined area;
wherein the setting unit sets the page address in response to a user command performed by a host device;
wherein the control unit programs the page address of the address information stored in the data register into the register when a verification command is executed by the host device.

2. The semiconductor memory device as claimed in claim 1, wherein the setting unit further sets indication information indicating whether the page address has been stored, and the control unit determines whether to perform the internal sequence or not according to the indication information.

3. The semiconductor memory device as claimed in claim 1, wherein the register further stores flag information indicating whether the page address has been stored.

4. The semiconductor memory device as claimed in claim 1, wherein the internal sequence is a power-up sequence which is performed when the semiconductor memory device powers up, and the internal sequence comprises performing a read-out command.

5. The semiconductor memory device as claimed in claim 1, wherein the semiconductor memory device is a flash memory.

6. A method for starting up a system, applied to a system comprising a semiconductor memory device and a host device, comprising:
setting a page address of a memory array which is initially read out at startup to the semiconductor memory device in response to a user command performed by the host device; and
performing an internal sequence to read out the set page address at startup of the semiconductor memory device and, according to the read-out page address, transmitting page data corresponding to the read-out page address from the memory array to a page buffer;
wherein the page address is stored in a data register, and the page address is programmed into a register which is accessed at startup of the semiconductor memory device when a verification command is executed by the host device.

7. The semiconductor memory device as claimed in claim 1, wherein the host device executes the user command, and then the user designates and inputs the address information before the control unit programs the page address of the address information stored in the data register into the register.

8. The semiconductor memory device as claimed in claim 1, wherein the page data transmitted to the page buffer is outputted by responding to toggles of a read-out clock signal and without inputting commands or the page address from outside of the semiconductor memory device.

9. The semiconductor memory device as claimed in claim 1, wherein the page data of the page address initially read out at startup and set to any position in the user area can be freely programmed by the user.

10. A computer program product, performed by a semiconductor memory device to perform a startup method, wherein the startup method comprises:
programing a page address which is initially read out at startup and stored in a data register into a register when a verification command is executed by a host device, and the register is accessed at startup of the semiconductor memory device;
performing an internal sequence to read out the page address from the register where the page address is set and transmit page data corresponding to the read-out page address from a memory array to a page buffer.

11. The computer program product as claimed in claim 10, wherein the startup method further comprises:
performing the internal sequence according to indication information indicating whether the page address has been set to the register.

* * * * *